No. 890,318. PATENTED JUNE 9, 1908.
H. H. WALSH.
DUMPING WAGON.
APPLICATION FILED DEC. 10, 1906.
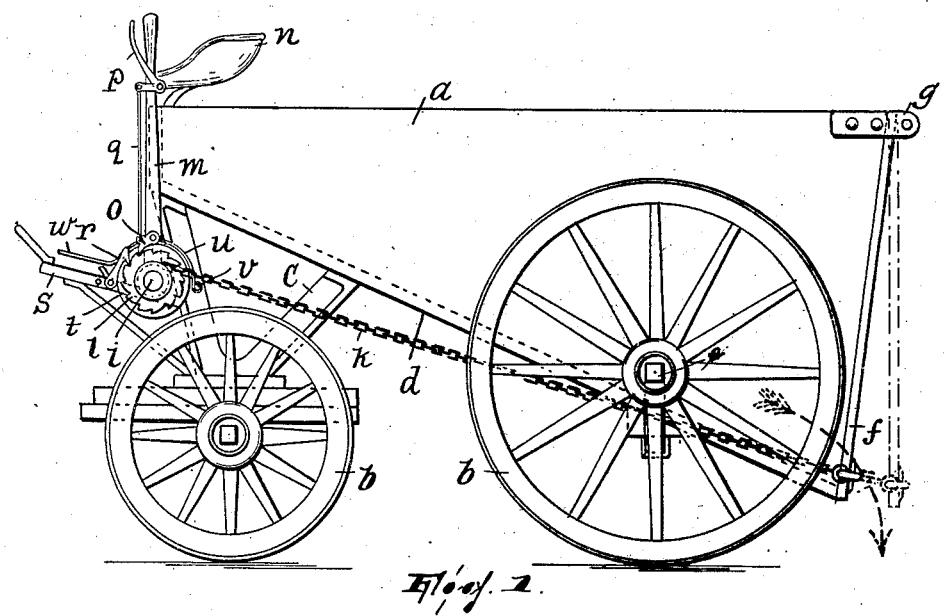
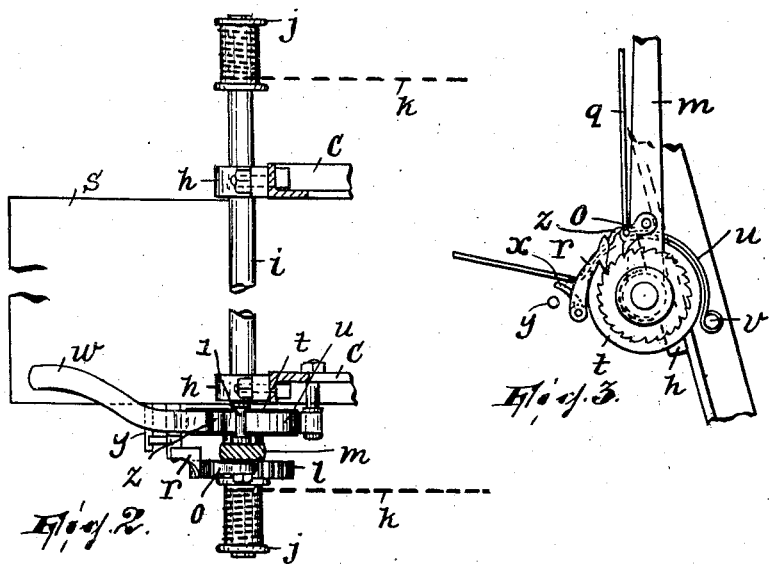
WITNESSES:
Wm. D. Bell
Adele Glatt
INVENTOR
Hiram H. Walsh,
BY
ATTORNEYS.

UNITED STATES PATENT OFFICE.

HIRAM H. WALSH, OF LITTLE FERRY, NEW JERSEY.

DUMPING-WAGON.

No. 890,318.  Specification of Letters Patent.  Patented June 9, 1908.

Application filed December 10, 1906. Serial No. 347,169.

*To all whom it may concern:*

Be it known that I, HIRAM H. WALSH, a citizen of the United States, residing in Little Ferry, county of Bergen, State of New Jersey, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to dumping wagons and particularly to dumping wagons used especially for road-making and similar purposes and so designed that the gravel, sand, crushed stone and the like carried by the wagon is spread by the same itself so as to avoid as far as possible subsequent raking or shoveling in order to properly lay the discharged load.

My object is to so constru a wagon of the kind indicated that the operation of spreading the load will be rendered extremely simple and convenient; this object I have accomplished by constructing the wagon substantially as herein described and shown whereby it will be found that the expense of building the same is kept well within a reasonable amount and substantially all of those features which have proved necessary to wagons of this type are retained.

My invention will be found fully illustrated in the accompanying drawings, wherein, Figure 1 is a side view of a wagon of the kind indicated provided with my improved mechanism for spreading the load; Fig. 2 is a sectional view taken just above a certain shaft $i$; and, Fig. 3 is an enlarged view in side elevation of the essential parts of said mechanism.

$a$ designates the wagon body and $b$ the wheels; the front wheels support a yoke $c$ which in turn sustains the front part of the wagon body $a$, the bottom $d$ of the latter having quite a pitch or incline, as shown, by virtue of said yoke and also by virtue of the rear axle $e$ being U-shaped as shown in Fig. 1, so that the rear of the wagon approaches rather close to the ground. This construction leads to the load discharging itself freely, by gravity, as soon as released, and to its not unduly scattering.

$f$ is the tail-gate which is pivoted in brackets $g$ at the top of the back of the wagon, the back of the wagon being so formed that when the tail-gate is closed its lower end is forward of the perpendicular extending through its upper or pivoted end; thus, however little of the load may remain in the wagon body upon discharging, if the tail-gate is free or released there is always an outlet left for its escape.

In brackets $h$ bolted to the yoke $c$ is journaled a shaft $i$ on the ends of which are drums $j$, and around these drums are wound chains or the like $k$ extended rearwardly and connected to the tail-gate $f$ at the sides thereof. Next to the left hand drum $j$ is a ratchet wheel $l$ which is fixed on the shaft. Next to the ratchet wheel is a hand lever $m$ which is fulcrumed on the shaft $i$ and extends upwardly along side of the front of the wagon, in convenient reach of the driver's seat $n$. This lever $m$ carries a pawl $o$ which is pivoted thereto and engages the ratchet $l$, being adapted for control from a hand grip $p$ in the form of a crank pivoted to the lever $m$ and connected with the pawl $o$ by a pitman $q$. Another pawl $r$ is pivoted on the driver's foot board $s$ and coöperates with the pawl $o$ to hold the ratchet $l$ against back action.

Next to the lever $m$ is a friction wheel $t$, fixed on shaft $i$, and around this friction wheel and adapted to peripherally engage the same extends a band brake $u$, secured on a pin $v$ projecting from the yoke $c$ at one end and having its other end projecting over the foot board in convenient reach of the driver's foot, as at $w$.

The weight of the parts $p$, $q$ and $o$ will keep the pawl $o$ normally against the ratchet. In order to limit the movement of pawl $r$ when out of engagement with the ratchet I provide it with a lug $x$ adapted to engage a pin $y$ on the foot board.

In view of the foregoing description it will be seen that the driver from his seat can close the tail gate, pawl $r$ being against the ratchet, by vibrating the lever $m$, the pawl $o$ slipping freely over the ratchet on the back stroke and turning the ratchet on the forward stroke, the ratchet being each time held against backward rotation by the other pawl. When the load is to be discharged, the pawl $r$ may be either unshipped by the driver's foot or by releasing the pawl $o$ and throwing the lever $m$ forward until pawl $o$ discharges pawl $r$ from the ratchet, leaving the shaft $i$ free to rotate as the weight of the load pushes the tail-gate open, unwinding the chains from the drums $j$. In order to adjust the distance to which the tail board is thus permitted to open, the driver may apply the band brake $w$ with his foot. But since, by accident, the driver may not be prepared to apply the band brake upon the release of the shaft $i$ and in order to place the whole operation of dumping within the control of the driver's hand, alone, I provide the band brake with a projection $z$, which may be in the form of a bend therein, see Fig. 3, with which is engaged a stud $l$ on the lever $m$. The arrangement of the parts $z$ and $l$ is preferably such that as the lever $m$ is thrown forward for the purpose of unshipping pawl $r$, the stud will engage the projection $z$ and bring the band brake into action, to some extent at least, just before the pawl $r$ is released; in order to continue the action of the band brake, the driver may either continue to use the lever $m$ or apply his foot to the band brake.

Having thus fully described my invention, what I claim as new and desire to secure by Letters Patent is:

1. The combination of the wagon body having a gate permitting the discharge of its load, a rotary shaft, operative connecting means between the shaft and the gate, a manually operated controlling device, a ratchet on the shaft, a pawl on said device, means for manually controlling the pawl, and another pawl pivoted independently of said device and relatively in advance, and projecting into the path of forward movement, of the other pawl whereby to be thereby engaged and caused to disengage the ratchet, substantially as described.

2. The combination of the wagon body having a gate permitting the discharge of its load, a rotary shaft, operative connecting means between the shaft and the gate, a manually operated controlling device, a ratchet on the shaft, a pawl on said device, means for manually controlling the pawl, another pawl pivoted independently of said device and projecting into the path of forward movement of the other pawl whereby to be thereby engaged and caused to disengage the ratchet, and a band-brake having a projection extending into the path of forward movement of a portion of said controlling device, substantially as described.

3. The combination of a wagon body, a rotary shaft, a part to be actuated from said shaft, a flexible connection connecting said part and the shaft, a controlling device, a ratchet on the shaft, a pawl on said device adapted to engage the ratchet to effect the relative advance of the shaft, means for controlling the pawl, and another pawl pivoted independently of said device and adapted to engage said ratchet to prevent reverse movement of the shaft, said other pawl projecting into the path of forward movement of the first-named pawl whereby to be thereby engaged and caused to disengage the ratchet, substantially as described.

In testimony, that I claim the foregoing, I have hereunto set my hand this 7th day of December, 1906.

HIRAM H. WALSH

Witnesses:
JOHN W. STEWARD,
WM. D. BELL.